(12) United States Patent
Wang

(10) Patent No.: US 10,668,352 B2
(45) Date of Patent: Jun. 2, 2020

(54) VIRTUAL REALITY HUMAN BODY OMNI-DIRECTIONAL MOVEMENT INPUT PLATFORM

(71) Applicant: Zhejiang Fanju Technology Co., Ltd., Hangzhou (CN)

(72) Inventor: Bo Wang, Hangzhou (CN)

(73) Assignee: Zhejiang Fanju Technology Co., Ltd., Hangzhou (CN)

( * ) Notice: Subject to any disclaimer, the term of this patent is extended or adjusted under 35 U.S.C. 154(b) by 40 days.

(21) Appl. No.: 15/737,625

(22) PCT Filed: May 3, 2016

(86) PCT No.: PCT/CN2016/080857
§ 371 (c)(1),
(2) Date: Dec. 18, 2017

(87) PCT Pub. No.: WO2016/202109
PCT Pub. Date: Dec. 22, 2016

(65) Prior Publication Data
US 2018/0157318 A1    Jun. 7, 2018

(30) Foreign Application Priority Data
Jun. 16, 2015   (CN) .......................... 2015 1 0333880

(51) Int. Cl.
*A63B 22/02* (2006.01)
*A63B 71/00* (2006.01)
(Continued)

(52) U.S. Cl.
CPC .......... *A63B 71/0054* (2013.01); *A63B 22/02* (2013.01); *A63B 26/00* (2013.01);
(Continued)

(58) Field of Classification Search
CPC ............... G06F 3/011; G06F 2203/012; A63B 2225/093; A63B 2220/80;
(Continued)

(56) References Cited

U.S. PATENT DOCUMENTS 5,562,572 A * 10/1996 Carmein .................. A61H 3/00
482/4
6,146,315 A * 11/2000 Schonenberger ...... A63B 22/02
482/54
(Continued)

FOREIGN PATENT DOCUMENTS

CN    203447687    2/2014
CN    204261259    4/2015
(Continued)

OTHER PUBLICATIONS

International Search Report, issued in the corresponding PCT application No. PCT/CN2016/080857, dated Aug. 10, 2016, 6 pages.

*Primary Examiner* — Megan Anderson
(74) *Attorney, Agent, or Firm* — Hamre, Schumann, Mueller & Larson, P.C.

(57) ABSTRACT

The disclosure relates to a Virtual Reality (VR) omnidirectional body motion input platform. The VR omnidirectional body motion input platform includes a universal treadmill. An upright post is provided on a side of the universal treadmill; a cantilever located above the universal treadmill is provided on the upright post; a suspension frame extending downward is connected to the cantilever; and a body restriction mechanism located above the universal treadmill is connected to a lower end of the suspension frame.

9 Claims, 9 Drawing Sheets

(51) Int. Cl.
*A63B 26/00* (2006.01)
*G06F 3/01* (2006.01)

(52) U.S. Cl.
CPC ... *A63B 2022/0271* (2013.01); *A63B 2220/80* (2013.01); *A63B 2225/093* (2013.01); *G06F 3/011* (2013.01); *G06F 2203/012* (2013.01)

(58) Field of Classification Search
CPC ........ A63B 2022/0271; A63B 71/0054; A63B 26/00; A63B 22/02
See application file for complete search history.

(56) References Cited

U.S. PATENT DOCUMENTS

| | | | | |
|---|---|---|---|---|
| 6,152,854 | A | * | 11/2000 | Carmein .............. A63B 22/025 482/4 |
| 9,056,240 | B2 | * | 6/2015 | Carrell ................. A63C 17/061 |
| D789,368 | S | * | 6/2017 | Goetgeluk .............. G06F 3/011 D14/388 |
| 2016/0354669 | A1 | * | 12/2016 | Rozenberg ......... A63B 71/0054 |

FOREIGN PATENT DOCUMENTS

| | | |
|---|---|---|
| CN | 104971469 | 10/2015 |
| CN | 204798714 | 11/2015 |
| CN | 204840820 | 12/2015 |
| CN | 204840821 | 12/2015 |

\* cited by examiner

VIRTUAL REALITY HUMAN BODY OMNI-DIRECTIONAL MOVEMENT INPUT PLATFORM

TECHNICAL FIELD OF THE INVENTION

The present utility model belongs to the technical field of sports equipment and particularly relates to a Virtual Reality (VR) omnidirectional body motion input platform.

BACKGROUND OF THE INVENTION

In the modern society where the computer network technology develops rapidly, the network technology brings not only the development of science, technology and economy, but also the innovation of entertainment marketing. Accordingly, various types of terminal emulators in the VR environment arise. However, majority of such terminal emulators require a large-area site for motion, have insufficient sensitivity and low fidelity, and cannot easily realize motions such as jumping, squatting and steering. Moreover, a person may get injured due to the lack of projective measures when he/she is moving. Therefore, the development of existing omnidirectional body motion platforms is greatly restricted.

In order to solve the problems in the prior art, a variety of solutions have been proposed by long-term exploration. For example, a Chinese Patent Document has disclosed an omnidirectional running and treading device [Application No. 201320425296.2], including a shell, a treadmill body, a main control system and a sensor, wherein both the sensor and the treadmill body are electrically connected to the main control system; the shell includes an upper cover on which a hole formed, and the treadmill body is provided within the shell below the hole; and, the sensor transmits the sensed stress information during running to the main control system, and the main control system controls and adjusts the direction of movement of the treadmill body.

Although the problem of the large occupation area of an existing omnidirectional body motion platform is solved by this solution to a certain extent, this solution still has the problems that the protective effect is low, and it is unable to ensure the safety of a human body during motion, etc.

SUMMARY OF THE INVENTION

In view of the above problems, an objective of the present utility model is to provide a VR omnidirectional body motion input platform which is simple and rational in structure and can protect a human body during motion.

For this purpose, the present utility model employs the following technical solutions. A VR omnidirectional body motion input platform is provided, including a universal treadmill, characterized in that an upright post is provided on a side of the universal treadmill; a cantilever located above the universal treadmill is provided on the upright post; a suspension frame extending downward is connected to the cantilever; and, a body restriction mechanism located above the universal treadmill is connected to a lower end of the suspension frame. Here, the universal treadmill includes a horizontal pedestal; the pedestal includes a treadmill base and a machine body mounting base which extends horizontally from a side of the treadmill base to the outside and is used for mounting the upright post; and an arc-shaped concave surface recessed downward is formed on the top of the treadmill base. A central plane arranged horizontally is provided in the center of the bottom of the arc-shaped concave surface. The arc-shaped concave surface is formed by splicing several arc-shaped surfaces which are distributed circumferentially and located on a circumferential periphery of the central plane. Each arc-shaped surface is correspondingly formed on an arc-shaped plate, and the central plane is formed on a central plate. Long parallel edges are formed at outer ends of the arc-shaped plates, and short parallel edges are formed at inner ends of the arc-shaped plates. The long parallel edges of the arc-shaped plates are spliced to form a regular polygon, the short parallel edges of the arc-shaped plates are spliced to form a regular polygon, and the central plane is a regular polygon having side edges in one-to-one correspondence to the short parallel edges. The arc-shaped plates and the central plate are formed integrally and made of rigid material. The treadmill base includes a regularly polygonal enclosure formed by several side plates. The machine body mounting base includes an extended frame which is fixedly connected to any side edge of the regularly polygonal enclosure. The side plates of the regularly polygonal enclosure are arranged in one-to-one correspondence to the long parallel edges, and a sealing plate is fixed on the bottom of the regularly polygonal enclosure and/or the extended frame. The pedestal is arranged within a treadmill shell. The treadmill shell includes a regularly polygonal first cylindrical shell arranged around the treadmill base and a parabolic second cylindrical shell arranged around the machine body mounting base. The second cylindrical shell is gradually tapered from bottom to top. The interior of the first cylindrical shell and the interior of the second cylindrical shell are communicated with each other and connected integrally. A camera is provided on the upright post, and the camera is connected to a platform host arranged within the second cylindrical shell. When in use, a user wears a pair of shoes having balls or other rolling structures to realize motions such as walking, running and jumping on the universal treadmill. Since the body restriction mechanism restricts the user on the suspension frame, the body can be protected when it is moving, and it is less likely to result in tumbling and the like.

In the VR omnidirectional body motion input platform, an upper end of the suspension frame is connected to the cantilever through a body follow-up connecting structure; and, a height adjustment structure capable of adjusting the height of the cantilever to adapt to persons of different heights is provided between the upright post and the cantilever. That is, when in use, the height adjustment structure can adapt to persons of different heights, the human body is restricted to the suspension frame, and the body follow-up connecting structure can support motions of the body such as running and jumping.

In the VR omnidirectional body motion input platform, a demising structure capable of avoiding contact with the body when the body is connected to the body restriction mechanism and is moving on the universal treadmill is formed on the suspension frame. Preferably, the demising structure can avoid contact with the body when the body is moving, so that the interference to the motion of the body is avoided.

In the VR omnidirectional body motion input platform, the suspension frame includes a mounting rod arranged vertically; the mounting rod is connected to a curved lever which is curved and has a lower end capable of being connected to the body restriction mechanism; and, the demising structure capable of avoiding contact with the body when the body is connected to the body restriction mechanism and is moving on the universal treadmill is formed on the curved lever. That is, the body restriction mechanism is arranged at the lower end of the curved lever, and the upper end of the curved lever is movably connected to the cantilever through the mounting rod.

In the VR omnidirectional body motion input platform, the curved lever includes a first connecting section arranged transversely; one end of the first connecting section is connected to the mounting rod, while the other end thereof is connected to a suspension section extending downward; a lower end of the suspension section is connected to a second connecting section which is arranged transversely and can be connected to the body restriction mechanism; and, the first connecting section is located right above the second connecting section, and the demising structure is formed between the first connecting section and the second connecting section. Thus, the anti-interference effect is improved.

In the VR omnidirectional body motion input platform, the first connecting section, the suspension section and the second connecting section are of an integrated structure; a first arc-shaped connecting portion is formed between the first connecting section and an upper end of the suspension section, and a second arc-shaped connecting portion is formed between the lower end of the suspension section and the second connecting section; the length of the first connecting section is greater than that of the second connecting section; and, the size of the first arc-shaped connecting portion is greater than that of the second arc-shaped connecting portion. Preferably, the mounting rod and the curved lever are connected integrally or fixedly connected through a detachable structure. A sleeve of an integrated structure is sheathed around the mounting rod and the curved lever. An expanded portion having a smaller bottom and a larger top is formed on the sleeve at a junction of the mounting rod with the curved lever. Preferably, the sleeve is made of flexible material, so that the impact resulted from the collision with the curved lever during the motion of the body can be effectively reduced.

In the VR omnidirectional body motion input platform, the body restriction mechanism includes a cylindrical restriction barrel which is connected to the suspension frame; an opening extending axially is formed on a side of the restriction barrel; and, a sealing structure capable of closing or opening the opening is provided on the restriction barrel. Preferably, the restriction barrel includes a C-shaped cylindrical frame made of elastic material. The cylindrical frame made of elastic material can enlarge the opening during mounting, so that it is convenient for mounting. A peripheral layer made of flexible material is provided on the periphery of the cylindrical frame. The sealing structure includes a flexible sealing sheet. Two ends of the flexible sealing sheet are connected to the restriction barrel, respectively, and at least one end of the flexible sealing sheet is connected to the restriction barrel through a detachable structure. The detachable structure is any one of or a combination of more of a button, a pair of hook and loop, a snap fastener, a zip fastener and a hook. The cylindrical frame includes a first arc-shaped ring having a first gap, and a second arc-shaped ring having a second gap arranged in the same direction as the first gap is provided below the first arc-shaped ring. One end of the first arc-shaped ring is connected to one end of the second arc-shaped ring through a first connecting rod, while the other end thereof is connected to the other end of the second arc-shaped ring through a second connecting rod. The opening is formed between the first connecting rod and the second connecting rod. The first arc-shaped ring and the second arc-shaped ring are arranged obliquely in opposite. The cylindrical frame is formed by bending a flat elastic wire rod. There is a first arc-shaped portion between one end of the first connecting rod and the first arc-shaped ring, and there is a second arc-shaped portion between the other end of the first connecting rod and the second arc-shaped ring. There is a third arc-shaped portion between one end of the second connecting rod and the first arc-shaped ring, and there is a fourth arc-shaped portion between the other end of the second connecting rod and the second arc-shaped ring. Fixed rings capable of being sheathed on legs are symmetrically provided at the lower end of the restriction barrel. A connecting belt capable of being connected to the suspension frame on a side of the back of the human body is provided between the fixed rings.

In the VR omnidirectional body motion input platform, the body follow-up connecting structure includes a universal bearing provided on the cantilever, and the upper end of the suspension frame is in axially movable connection to the universal bearing. Preferably, a through hole extending axially is formed within the universal bearing, the mounting rod passes through the through hole, and an axial guide component capable of realizing circumferential positioning and axial sliding of the mounting rod and the universal bearing is provided between the mounting rod and the universal bearing. The axial guide component includes at least one chute or strip-shaped bump axially arranged along the mounting rod, at least one strip-shaped bump or chute is formed on a circumferential inner side of the through hole, and the strip-shaped bump and the chute are connected with each other in a sliding manner. An elastic structure capable of keeping the mounting rod in a downward movement trend is provided between the universal bearing and the mounting rod. The elastic structure includes a limiting block arranged at the upper end of the mounting rod, and a spring is sheathed on the mounting rod. One end of the spring is resisted against the limiting block, while the other end thereof acts on an inner ring of the universal bearing. A cantilever hood located above the universal treadmill is provided at the upper end of the cantilever, and a tapered hole for allowing the mounting rod to pass therethrough is formed on the cantilever hood.

In the VR omnidirectional body motion input platform, the upright post includes at least one lower rod arranged vertically; the cantilever includes at least one upper rod arranged vertically, and an upper end of the upper rod is bent and extended above the universal treadmill; the lower rod and the upper rod are in one-to-one correspondence and muff-coupled with each other; and, the height adjustment structure is arranged between the lower rod and the upper rod. Preferably, there are two lower rods and two upper rods, and the universal bearing is arranged at bent upper ends of the upper rods. The height of movement of the upper rods is controlled by the height adjustment structure so as to adapt to persons of different heights.

In the VR omnidirectional body motion input platform, the height adjustment structure includes at least one retainer fixed on the lower rod body or the upper rod, the retainer is in threaded connection to an ejector block, a window is formed on the lower rod or the upper rod, and the ejector block can pass through the window to resist against the upper rod or the lower rod; a damping mechanism is provided between the upright post and the cantilever; and, the damping mechanism includes a damping rod arranged vertically, one end of which is connected to the upright post while the other end of which is connected to the cantilever. Preferably, the damping rod is arranged within a cylindrical mounting base which is connected to the machine body mounting base and parallel to the lower rod, an output rod of the damping rod is connected to an upper transmission sheet which is connected to the upper rod, and the damping rod passes through and is fixed onto a lower transmission sheet which is connected to the lower rod.

Compared with the prior art, the VR omnidirectional body motion input platform has the advantages that it is highly stable; it can restrain the body when a person is moving so that it is less likely to result in tumbling during the motion of the body, and is good in protective effect; and it is less likely to disturb the motion of the body, and can support motions of the body such as running, walking and jumping.

BRIEF DESCRIPTION OF THE DRAWINGS

FIG. 9 is a structural diagram of a body follow-up connecting structure according to the present utility model, in which:

Figure 1:
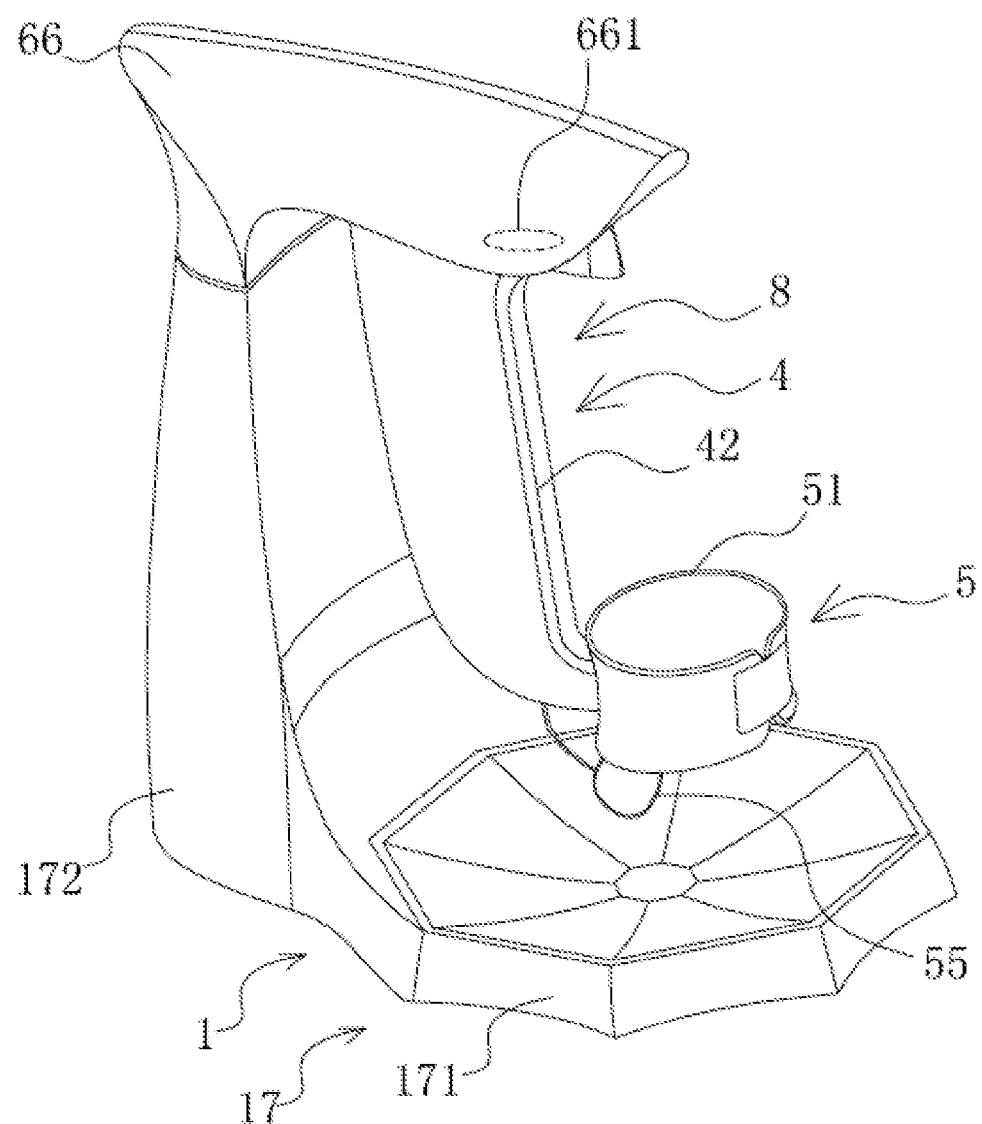
FIG. 1 is a structural diagram of the present utility model in a service state.

1: universal treadmill; 11: pedestal; 111: treadmill base; 112: machine body mounting base; 12: arc-shaped concave surface; 121: arc-shaped surface; 122: arc-shaped plate; 122a: long parallel edge; 122b: short parallel edge; 13: central plane; 131: central plate; 14: regularly polygonal enclosure; 141: side plate; 15: extended frame; 16: sealing plate; 17: treadmill shell; 171: first cylindrical shell; 172: second cylindrical shell; 2: upright post; 21: lower rod; 3: cantilever; 31: upper rod; 4: suspension frame; 41: mounting rod; 42: curved lever; 421: first connecting section; 422: suspension section; 423: second connecting section; 424: first arc-shaped connecting portion; 425: second arc-shaped connecting portion; 43: sleeve; 431: expanded portion; 5: body restriction mechanism; 51: restriction barrel; 52: opening; 53: sealing structure; 531: flexible sealing sheet; 532: detachable structure; 54: cylindrical frame; 541: first gap; 542: first arc-shaped ring; 543: second gap; 544: second arc-shaped ring; 545: first connecting rod; 546: second connecting rod; 547: first arc-shaped portion; 548: second arc-shaped portion; 549: third arc-shaped portion; 549a: fourth arc-shaped portion; 55: fixed ring; 551: connecting belt; 552: peripheral layer; 6: body follow-up connecting structure; 61: universal bearing; 611: through hole; 62: chute; 63: strip-shaped bump; 64: limiting block; 65: spring; 66: cantilever hood; 661: tapered hole; 7: height adjustment structure; 71: retainer; 72: ejector block; 73: window; 74: damping mechanism; 75: damping rod; 76: cylindrical mounting base; 77: upper transmission sheet; 78: lower transmission sheet; and, 8: demising structure.

DETAILED DESCRIPTION OF THE INVENTION

The present utility model will be further described below in detail by specific implementations with reference to the accompanying drawings.

As shown in FIGS. 1-4, a VR omnidirectional body motion input platform is provided, including a universal treadmill 1. An upright post 2 is provided on a side of the universal treadmill 1. A cantilever 3 located above the universal treadmill 1 is provided on the upright post 2. A suspension frame 4 extending downward is connected to the cantilever 3. A body restriction mechanism 5 located above the universal treadmill 1 is connected to a lower end of the suspension frame 4. Here, the universal treadmill 1 includes a horizontal pedestal 11. The pedestal 11 includes a treadmill base 111 and a machine body mounting base 112 which extends horizontally from a side of the treadmill base 111 to the outside and is used for mounting the upright post 2. An arc-shaped concave surface 12 recessed downward is formed on the top of the treadmill base 111. A central plane 13 arranged horizontally is provided in the center of the bottom of the arc-shaped concave surface 12. The arc-shaped concave surface 12 is formed by splicing several arc-shaped surfaces 121 which are distributed circumferentially and located on a circumferential periphery of the central plane 13. Each arc-shaped surface 121 is correspondingly formed on an arc-shaped plate 122, and the central plane 13 is formed on a central plate 131. Long parallel edges 122a are provided at outer ends of the arc-shaped plates 122, and short parallel edges 122b are provided at inner ends of the arc-shaped plates 122. The long parallel edges 122a of the arc-shaped plates 122 are spliced to form a regular polygon, the short parallel edges 122b of the arc-shaped plates 122 are spliced to form a regular polygon, and the central plane 131 is a regular polygon having side edges in one-to-one correspondence to the short parallel edges 122b. The arc-shaped plates 122 and the central plate 131 are formed integrally and made of rigid material. The treadmill base 111 includes a regularly polygonal enclosure 14 formed by several side plates 141. The machine body mounting base 112 includes an extended frame 15 which is fixedly connected to any side edge of the regularly polygonal enclosure 14. The side plates 141 of the regularly polygonal enclosure 14 are arranged in one-to-one correspondence to the long parallel edges 122a, and a sealing plate 16 is fixed on the bottom of the regularly polygonal enclosure 14 and/or the extended frame 15. The pedestal 11 is arranged within a treadmill shell 17. The treadmill shell 17 includes a regularly polygonal first cylindrical shell 171 arranged around the treadmill base 111 and a parabolic second cylindrical shell 172 arranged around the machine body mounting base 112. The second cylindrical shell 172 is gradually tapered from bottom to top. The interior of the first cylindrical shell 171 and the interior of the second cylindrical shell 172 are communicated with each other and connected integrally. A camera is provided on the upright post, and the camera is connected to a platform host arranged within the second cylindrical shell 172. When in use, a user wears a pair of shoes having balls or other rolling structures to realize motions such as walking, running and jumping on the universal treadmill 1. Since the body restriction mechanism 5 restricts the user on the cantilever 4, the body can be protected when it is moving, and it is less likely to result in tumbling and the like.

In this embodiment, the upright post 2 includes at least one lower rod 21 arranged vertically; the cantilever 3 includes at least one upper rod 31 arranged vertically, and an upper end of the upper rod 31 is bent and extended above the universal treadmill 1; the lower rod 21 and the upper rod 31 are in one-to-one correspondence and muff-coupled with each other; and, the height adjustment structure 7 is arranged between the lower rod 21 and the upper rod 31. Preferably, there are two lower rods 21 and two upper rods 31, and the universal bearing 61 is arranged at bent upper ends of the upper rods. The height of movement of the upper rods 31 is controlled by the height adjustment structure 7 so as to adapt to persons of different heights. The height adjustment structure 7 includes at least one retainer 71 fixed on the lower rod body 21 or the upper rod 31, the retainer 71 is in threaded connection to an ejector block 72, a window 73 is formed on the lower rod 21 or the upper rod 31, and the ejector block 72 can pass through the window 73 to resist against the upper rod 31 or the lower rod 21. A damping mechanism 74 is provided between the upright post 2 and the cantilever 3. The damping mechanism 74 includes a damping rod 75 arranged vertically, one end of which is connected to the upright post 2 while the other end of which is connected to the cantilever 3. Preferably, the damping rod 75 is arranged within a cylindrical mounting base 76 which is connected to the machine body mounting base 112 and parallel to the lower rod, an output rod of the damping rod 75 is connected to an upper transmission sheet 77 which is connected to the upper rod 31, and the damping rod 75 passes through and is fixed onto a lower transmission sheet 78 which is connected to the lower rod 21.

As shown in FIGS. 1-6, in this embodiment, an upper end of the suspension frame 4 is connected to the cantilever 3 through a body follow-up connecting structure 6; and, a height adjustment structure 7 capable of adjusting the height of the cantilever 3 to adapt to persons of different heights is provided between the upright post 2 and the cantilever 3. In other words, when in use, the height adjustment structure 7 can adapt to persons of different heights, the human body is restricted to the cantilever 3, and the body follow-up connecting structure 6 can support motions of the body such as running and jumping. A demising structure 8 capable of avoiding contact with the body when the body is connected to the body restriction mechanism 5 and is moving on the universal treadmill 1 is formed on the suspension frame 4. Preferably, the demising structure 8 can avoid contact with the body when the body is moving, so that the interference to the motion of the body is avoided. The suspension frame 4 includes a mounting rod 41 arranged vertically; the mounting rod 41 is connected to a curved lever 42 which is curved and has a lower end capable of being connected to the body restriction mechanism 5; and the demising structure 8 capable of avoiding contact with the body when the body is connected to the body restriction mechanism 5 and is moving on the universal treadmill 1 is formed on the curved lever 42. That is, the body restriction mechanism 5 is arranged at the lower end of the curved lever 42, and the upper end of the curved lever 42 is movably connected to the cantilever 3 through the mounting rod 41. To improve the anti-interference effect, the curved lever 42 includes a first connecting section 421 arranged transversely. One end of the first connecting section 421 is connected to the mounting rod 41, while the other end thereof is connected to a suspension section 422 extending downward. A lower end of the suspension section 422 is connected to a second connecting section 423 which is arranged transversely and can be connected to the body restriction mechanism 5. The first connecting section 421 is located right above the second connecting section 423, and the demising structure 8 is formed between the first connecting section 421 and the second connecting section 423. The first connecting section 421, the suspension section 422 and the second connecting section 423 are of an integrated structure. A first arc-shaped connecting portion 424 is formed between the first connecting section 421 and an upper end of the suspension section 422, and a second arc-shaped connecting portion 425 is formed between the lower end of the suspension section 422 and the second connecting section 423. The length of the first connecting section 421 is greater than that of the second connecting section 423, and the size of the first arc-shaped connecting portion 424 is greater than that of the second arc-shaped connecting portion 425. Preferably, the mounting rod 41 and the curved lever 42 are connected integrally or fixedly connected through a detachable structure. A sleeve 43 of an integrated structure is sheathed around the mounting rod 41 and the curved lever 42. An expanded portion 431 having a smaller bottom and a larger top is formed on the sleeve 43 at a junction of the mounting rod with the curved lever. Preferably, the sleeve 43 is made of flexible material so that the impact resulted from the collision with the curved lever 42 during the motion of the body can be effectively reduced.

As shown FIGS. 1-3 and FIGS. 7-8, in this embodiment, the body restriction mechanism 5 includes a cylindrical restriction barrel 51 which is connected to the suspension frame 4, an opening 52 extending axially is formed on a side of the restriction barrel 51, and a sealing structure 53 capable of closing or opening the opening 52 is provided on the restriction barrel 51. Preferably, the restriction barrel 51 includes a C-shaped cylindrical frame 54 made of elastic material. The cylindrical frame 54 made of elastic material can enlarge the opening 52 during mounting, so that it is convenient for mounting. A peripheral layer 55 made of flexible material is provided on the periphery of the cylindrical frame 54. The sealing structure 53 includes a flexible sealing sheet 531. Two ends of the flexible sealing sheet 531 are connected to the restriction barrel 51, respectively, and at least one end of the flexible sealing sheet is connected to the restriction barrel 51 through a detachable structure 532. The detachable structure 532 is any one of or a combination of more of a button, a pair of hook and loop, a snap fastener, a zip fastener and a hook. The cylindrical frame 54 includes a first arc-shaped ring 542 having a first gap 541, and a second arc-shaped ring 544 having a second gap 543 arranged in the same direction as the first gap 541 is provided below the first arc-shaped ring 542. One end of the first arc-shaped ring 542 is connected to one end of the second arc-shaped ring 544 through a first connecting rod 545, while the other end thereof is connected to the other end of the second arc-shaped ring 544 through a second connecting rod 546. The opening 52 is formed between the first connecting rod 545 and the second connecting rod 546. The first arc-shaped ring 542 and the second arc-shaped ring 544 are arranged obliquely in opposite. The cylindrical frame 54 is formed by bending a flat elastic wire rod. There is a first arc-shaped portion 547 between one end of the first connecting rod 545 and the first arc-shaped ring 542, and there is a second arc-shaped portion 548 between the other end of the first connecting rod 545 and the second arc-shaped ring 544. There is a third arc-shaped portion 549 between one end of the second connecting rod 546 and the first arc-shaped ring 542, and there is a fourth arc-shaped portion 549a between the other end of the second connecting rod 546 and the second arc-shaped ring 544. Fixed rings 55 capable of being sheathed on legs are symmetrically provided at the lower end of the restriction barrel 51. A connecting belt 551 capable of being connected to the suspension frame 4 on a side of the back of the human body is provided between the fixed rings 55.

Figure 2:
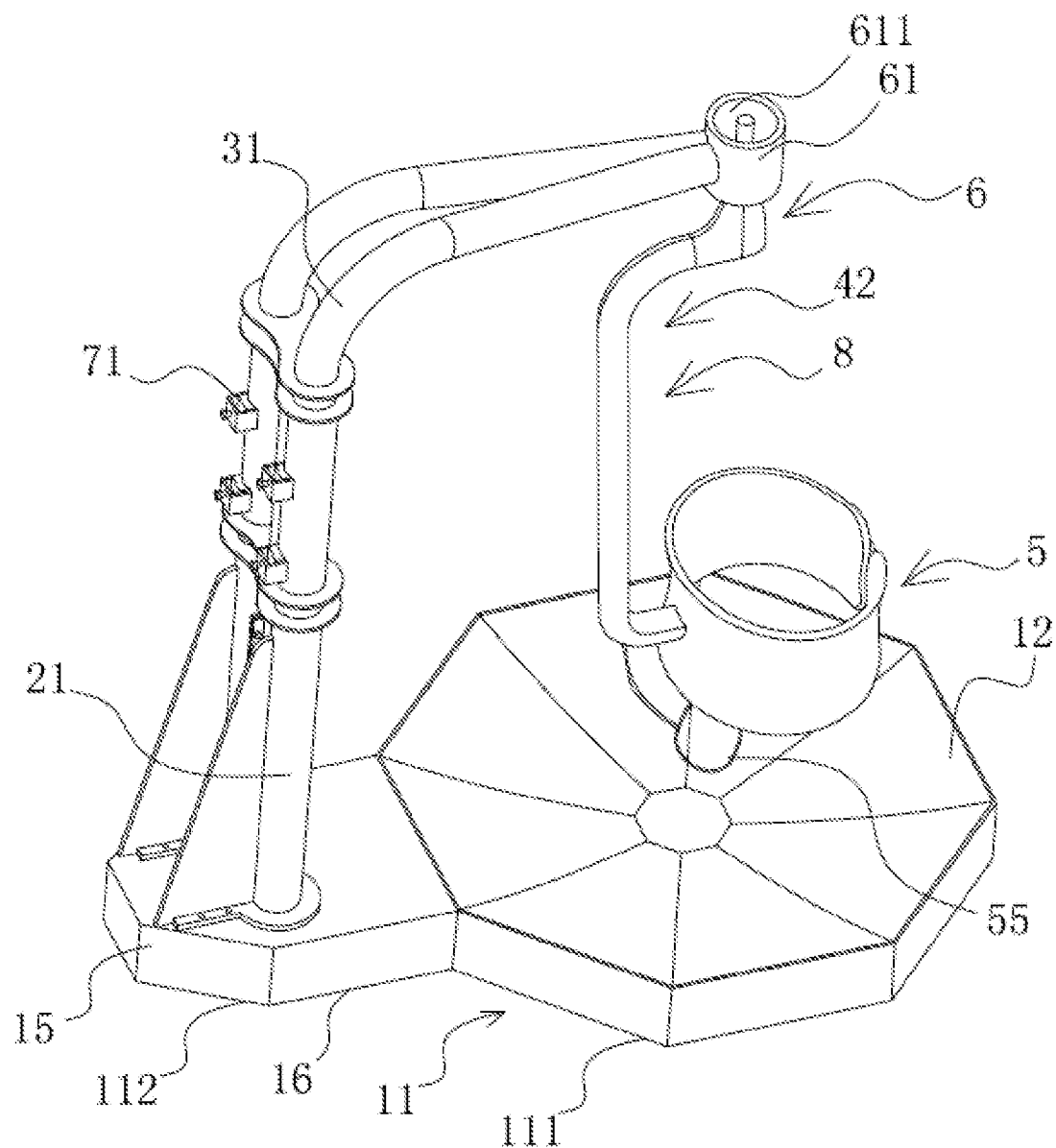
FIG. 2 is a partially structural diagram of the present utility model.
Figure 3:
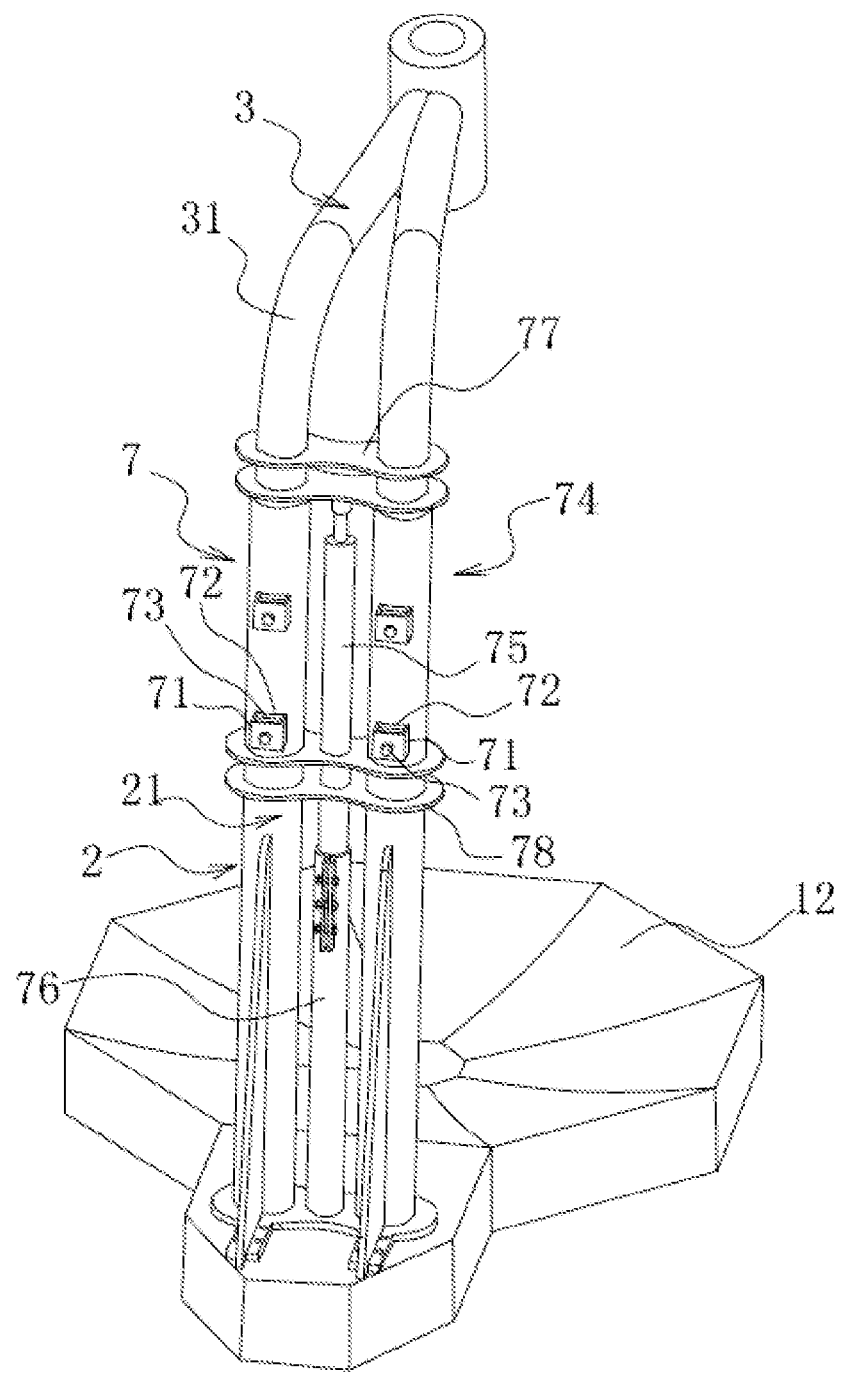
FIG. 3 is a partially structural diagram of the present utility model, when viewed from another perspective.
Figure 4:
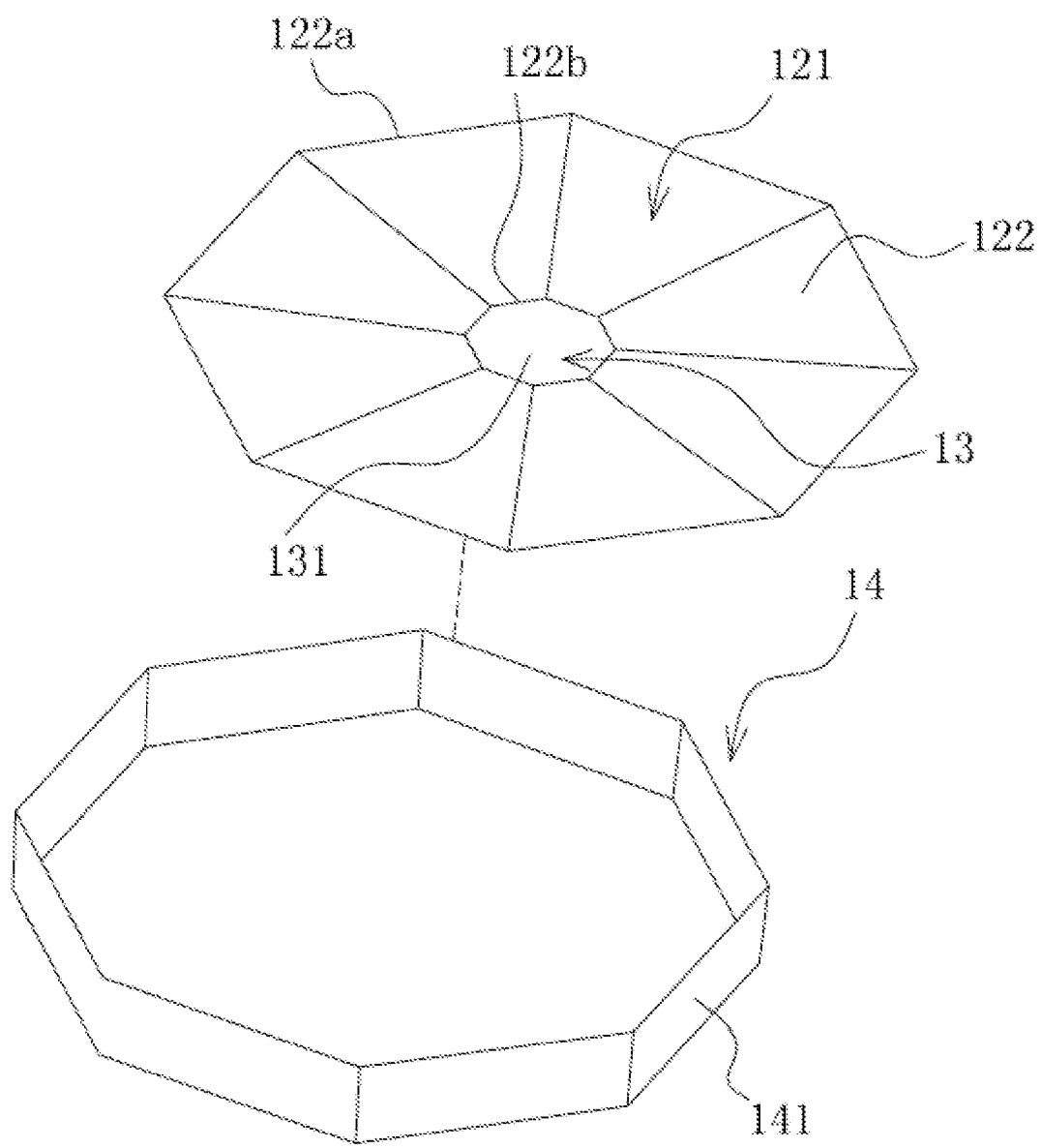
FIG. 4 is a partially structural diagram of a universal treadmill according to the present utility model.
Figure 5:
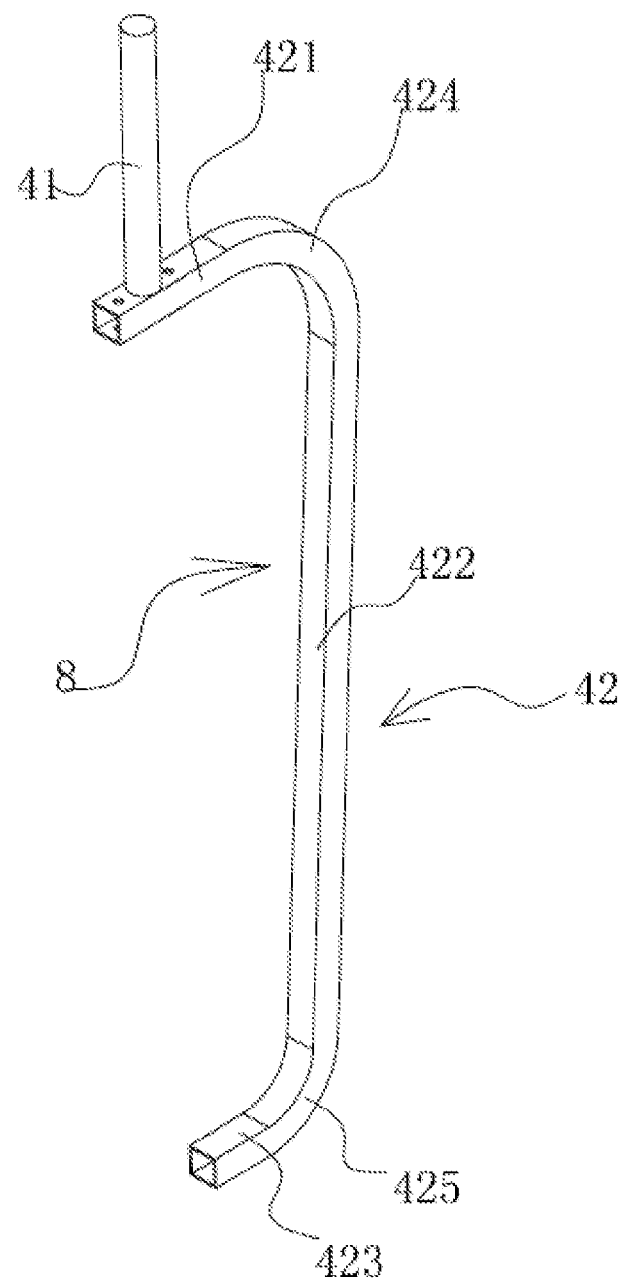
FIG. 5 is a partially structural diagram of a suspension frame according to the present utility model.
Figure 6:
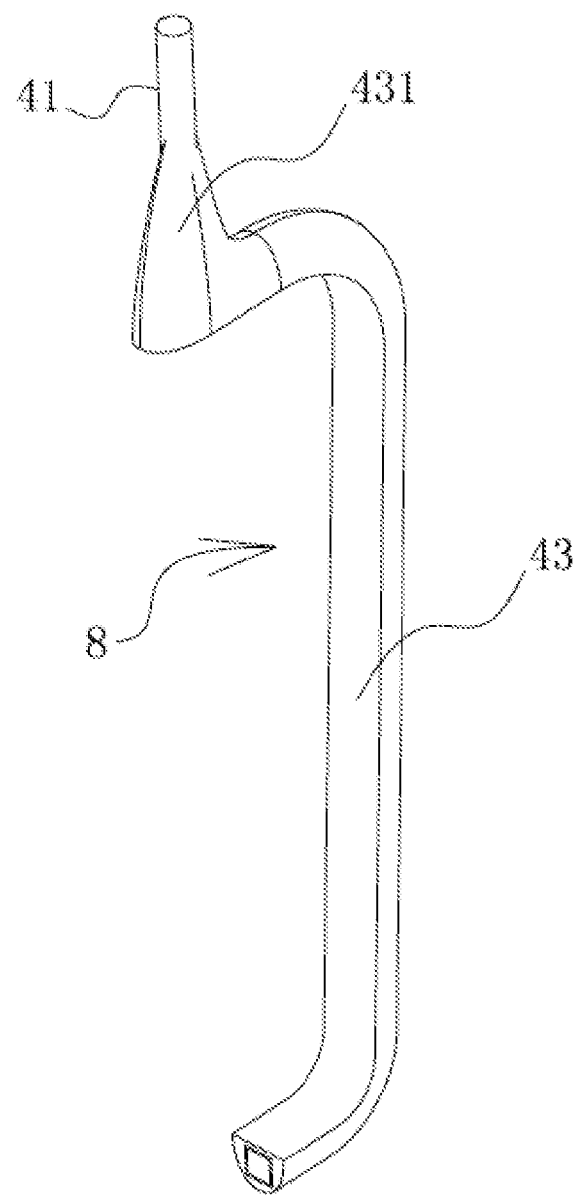
FIG. 6 is another partially structural diagram of the suspension frame according to the present utility model.
Figure 7:
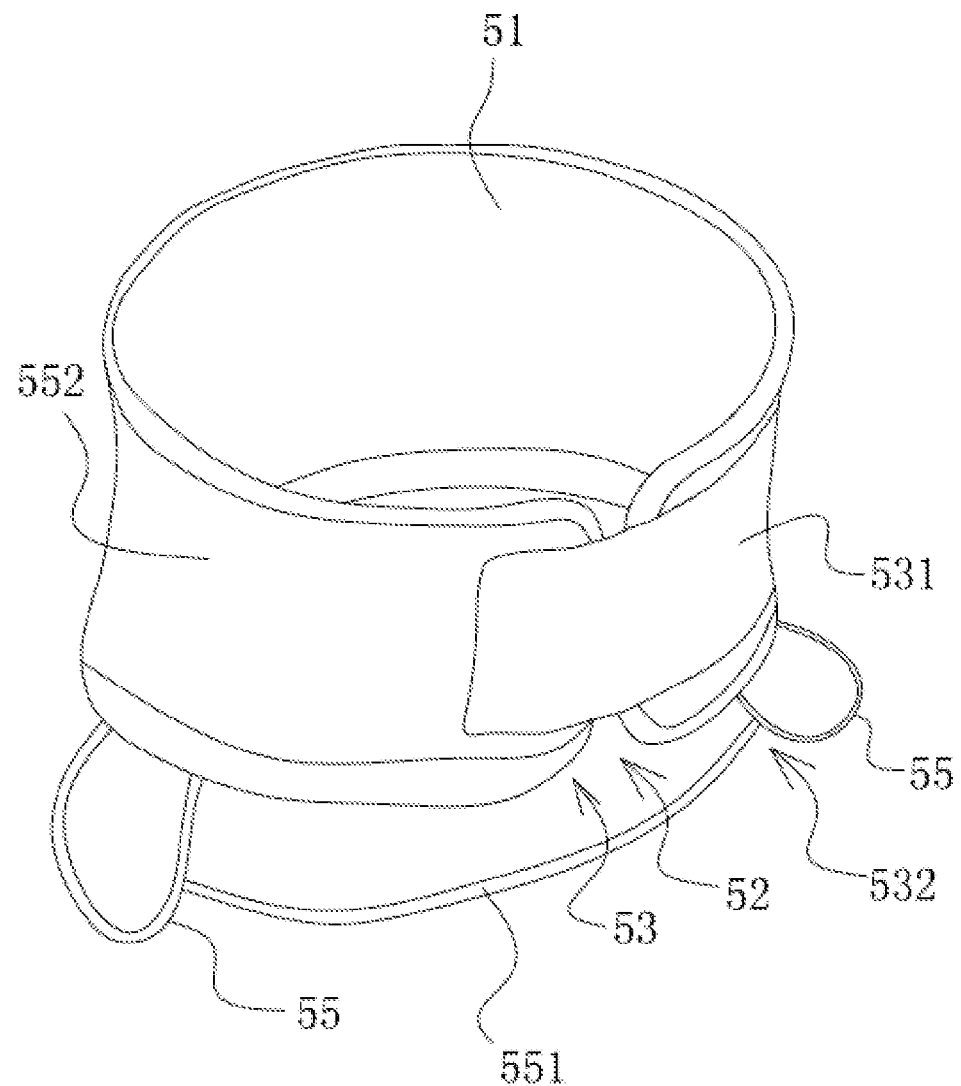
FIG. 7 is a structural diagram of a body restriction mechanism according to the present utility model.
Figure 8:
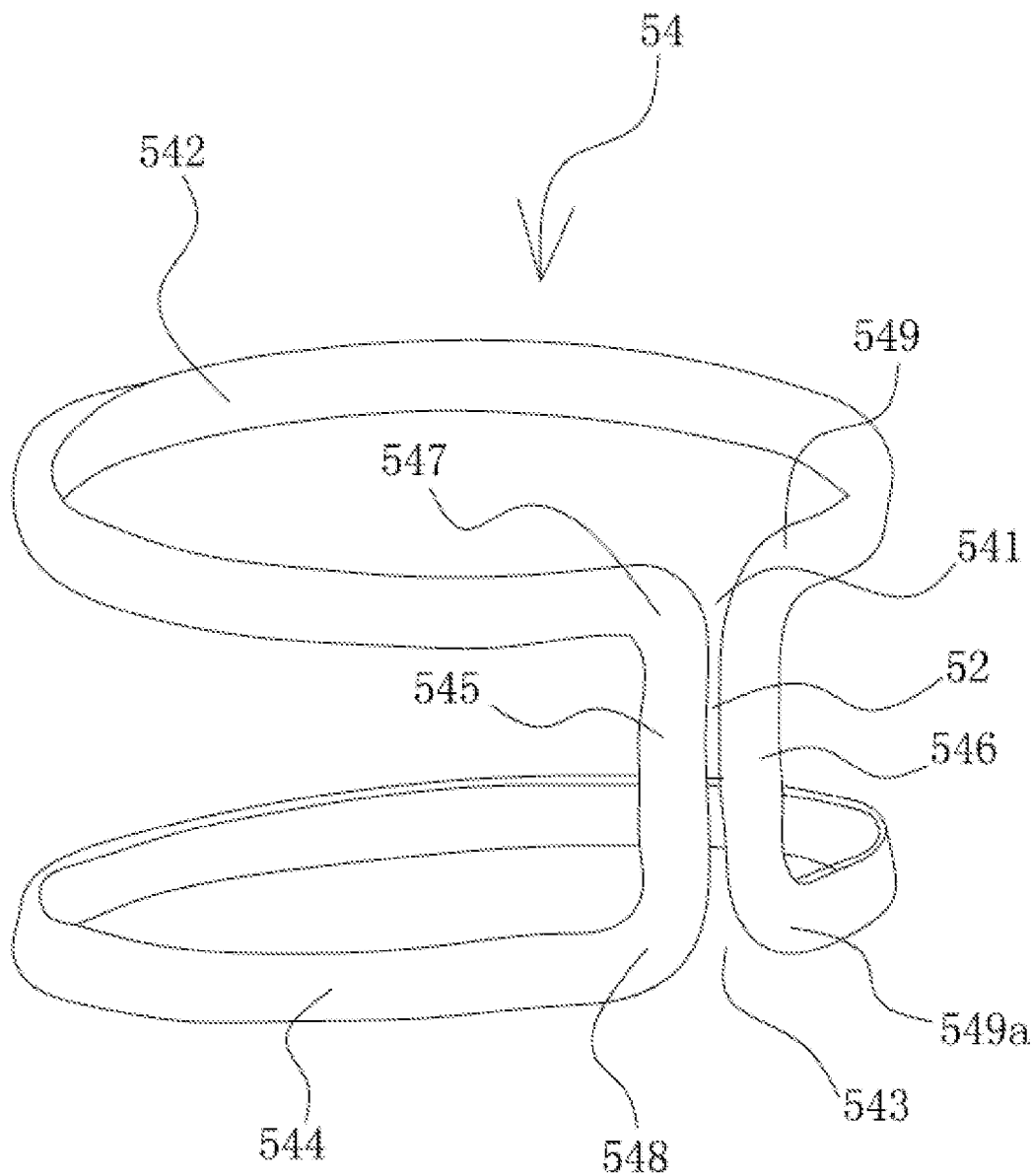
FIG. 8 is a partially structural diagram of the body restriction mechanism according to the present utility model.
Figure 9:
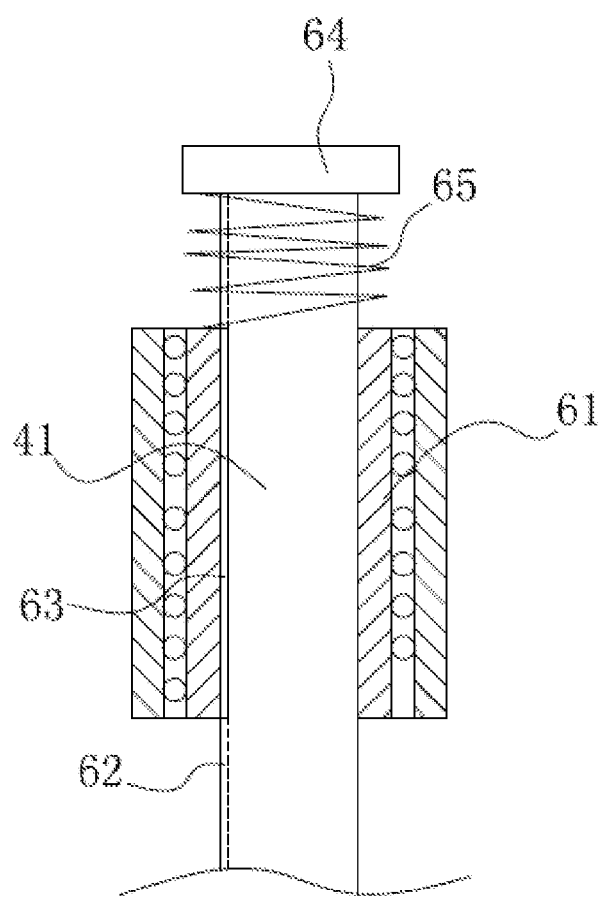

As shown in FIGS. 1-2 and FIG. 9, the body follow-up connecting structure 6 includes a universal bearing 61 provided on the cantilever 3, and the upper end of the suspension frame 4 is in axially movable connection to the universal bearing 61. Preferably, a through hole 611 extending axially is formed within the universal bearing 61, the mounting rod 41 passes through the through hole 611, and an axial guide component capable of realizing circumferential positioning and axial sliding of the mounting rod 41 and the universal bearing 61 is provided between the mounting rod 41 and the universal bearing 61. The axial guide component includes at least one chute 62 or strip-shaped bump 63 arranged axially along the mounting rod 41, at least one strip-shaped bump 63 or chute 62 is formed on a circumferential inner side of the through hole 611, and the strip-shaped bump 63 and the chute 62 are connected with each other in a sliding manner. An elastic structure capable of keeping the mounting rod 41 in a downward movement trend is provided between the universal bearing 61 and the mounting rod 41. The elastic structure includes a limiting block 64 arranged at the upper end of the mounting rod 41, and a spring 65 is sheathed on the mounting rod 41. One end of the spring 65 is resisted against the limiting block 64, while the other end thereof acts on an inner ring of the universal bearing 61. A cantilever hood 66 located above the universal treadmill 1 is provided at the upper end of the cantilever 3, and a tapered hole 661 for allowing the mounting rod 41 to pass therethrough is formed on the cantilever hood 66.

The principle of this embodiment is as follows: when in use, the restriction barrel 51 is sheathed on the abdomen of the body by enlarging the opening 52, and the opening 52 is sealed by the flexible sealing sheet 531 so that the restriction barrel 52 is mounted on the body; meanwhile, the fixed rings 55 are sheathed on the legs; since the restriction barrel 52 is connected to the suspension frame 4, the body is restricted onto the suspension frame 4; moreover, the universal treadmill 1 is provided below the suspension frame 4 and the arc-shaped concave surface 12 is formed on the universal treadmill 1, so that a user wears a pair of shoes having balls or other rolling structures to realize motions such as walking, running and jumping on the universal treadmill 1; the cantilever 3 is provided on a side of the universal treadmill 1, and the height of the cantilever 3 can be adjusted by the height adjustment structure 7 to adapt to different persons; the suspension frame 4 and the universal bearing 61 on the cantilever 3 are connected with each other and do an axial motion, so that the user is restricted onto the suspension frame 4 and the motions such as running and jumping of the user are supported; consequently, the body can be protected when it is moving so that it is less likely to result in tumbling and the like; furthermore, since there is a demising structure 8 on the suspension frame 4, it is less likely to disturb the motion of the body.

The specific embodiments described herein merely illustrate the spirit of the present utility model. Those skilled in the art can make various modifications or supplements to the specific embodiments described herein or replace the specific embodiments described herein in a similar way, without departing from the spirit of the present utility model or the scope defined by the appended claims.

Although the terms such as the universal treadmill 1, the pedestal 11, the treadmill base 111, the machine body mounting base 112, the arc-shaped concave surface 12, the arc-shaped surface 121, the arc-shaped plate 122, the long parallel edge 122a, the short parallel edge 122, the central plane 13, the central plate 131, the regularly polygonal enclosure 14, the side plate 141, the extended frame 15, the sealing plate 16, the treadmill shell 17, the first cylindrical shell 171, the second cylindrical shell 172, the upright post 2, the lower rod 21, the cantilever 3, the upper rod 31, the suspension frame 4, the mounting rod 41, the curved lever 42, the first connecting section 421, the suspension section 422, the second connecting section 423, the first arc-shaped connecting portion 424, the second arc-shaped connecting portion 425, the sleeve 43, the expanded portion 431, the body restriction mechanism 5, the restriction barrel 51, the opening 52, the sealing structure 53, the flexible sealing sheet 531, the detachable structure 532, the cylindrical frame 54, the first gap 541, the first arc-shaped ring 542, the second gap 543, the second arc-shaped ring 544, the first connecting rod 545, the second connecting rod 546, the first arc-shaped portion 547, the second arc-shaped portion 548, the third arc-shaped portion 549, the fourth arc-shaped portion 549a, the fixed ring 55, the connecting belt 551, the peripheral layer 552, the body follow-up connecting structure 6, the universal bearing 61, the through hole 611, the chute 62, the strip-shaped bump 63, the limiting block 64, the spring 65, the cantilever hood 66, the tapered hole 661, the height adjustment structure 7, the retainer 71, the ejector block 72, the window 73, the damping mechanism 74, the damping rod 75, the cylindrical mounting base 76, the upper transmission sheet 77, the lower transmission sheet 78 and the demising structure 8 are frequently used herein, the probability of other terms is not excluded. These terms are merely used for more conveniently describing and explaining the essence of the present utility model, and the interpretation of the terms into any additional limitations shall be departed from the spirit of the present utility model.

The invention claimed is:

1. A Virtual Reality (VR) omnidirectional body motion input platform, comprising:
   a universal treadmill,
   wherein an upright post is provided on a side of the universal treadmill;
   a cantilever, located above the universal treadmill, is provided on the upright post;
   a suspension frame, extending downward, is connected to the cantilever;
   a body restriction mechanism, located above the universal treadmill, is connected to a lower end of the suspension frame;
   an upper end of the suspension frame is connected to the cantilever through a body follow-up connecting structure; and
   a height adjustment structure capable of adjusting a height of the cantilever to adapt to persons of different heights is provided between the upright post and the cantilever.

2. The Virtual Reality (VR) omnidirectional body motion input platform according to claim 1, wherein a demising structure capable of avoiding contact with a body when the body is placed in the body restriction mechanism and is moving on the universal treadmill, is formed on the suspension frame.

3. The Virtual Reality (VR) omnidirectional body motion input platform according to claim 2, wherein the suspension frame comprises a mounting rod arranged vertically;
   the mounting rod is connected to a curved lever which is curved and has a lower end capable of being connected to the body restriction mechanism.

4. The Virtual Reality (VR) omnidirectional body motion input platform according to claim 3, wherein the curved lever comprises a first connecting section arranged transversely; one end of the first connecting section is connected to the mounting rod, while the other end thereof is connected to a suspension section extending downward; a lower end of the suspension section is connected to a second connecting section which is arranged transversely and is configured to be connected to the body restriction mechanism; and, the first connecting section is located right above the second connecting section, and the demising structure is formed between the first connecting section and the second connecting section.

5. The Virtual Reality (VR) omnidirectional body motion input platform according to claim 4, wherein the first connecting section, the suspension section and the second connecting section are of an integrated structure; a first arc-shaped connecting portion is formed between the first connecting section and an upper end of the suspension section, and a second arc-shaped connecting portion is formed between the lower end of the suspension section and the second connecting section; the length of the first connecting section is greater than that of the second connecting section; and, the size of the first arc-shaped connecting portion is greater than that of the second arc-shaped connecting portion.

6. The Virtual Reality (VR) omnidirectional body motion input platform according to claim 1, wherein the upright post comprises at least one lower rod arranged vertically; the cantilever comprises at least one upper rod arranged vertically, and an upper end of the at least one upper rod is bent and extended above the universal treadmill; the at least one lower rod and the at least one upper rod are in one-to-one correspondence and muff-coupled with each other; and, the height adjustment structure is arranged between the at least one lower rod and the at least one upper rod.

7. The Virtual Reality (VR) omnidirectional body motion input platform according to claim 6, wherein the height adjustment structure comprises at least one retainer fixed on the at least one lower rod or the at least one upper rod, the retainer is in threaded connection to an ejector block, a window is formed on the at least one lower rod or the at least one upper rod, and the ejector block is configured to pass through the window to resist against the at least one upper rod or the at least one lower rod; a damping mechanism is provided between the upright post and the cantilever; and, the damping mechanism comprises a damping rod arranged vertically, one end of which is connected to the upright post while the other end of which is connected to the cantilever.

8. The Virtual Reality (VR) omnidirectional body motion input platform according to claim 1, wherein the body restriction mechanism comprises a cylindrical restriction barrel which is connected to the suspension frame; an opening extending axially is formed on a side of the restriction barrel; and, a sealing structure capable of closing or opening the opening is provided on the restriction barrel.

9. The Virtual Reality (VR) omnidirectional body motion input platform according to claim 1, wherein the body follow-up connecting structure comprises a universal bearing provided on the cantilever, and the upper end of the suspension frame is in axially movable connection to the universal bearing.

* * * * *